Patented May 17, 1932

1,858,449

UNITED STATES PATENT OFFICE

GEORGE D. KNIGHT, OF REDWOOD CITY, CALIFORNIA, ASSIGNOR TO EMORY WINSHIP, OF SAN FRANCISCO, CALIFORNIA

INTAGLIO INK COMPOSITION

No Drawing. Application filed April 16, 1928. Serial No. 270,585.

This invention relates to an intaglio ink and is an improvement on the ink disclosed in my copending application Serial No. 180,343 filed April 1st, 1928.

The intaglio ink disclosed in the application just referred to has the desired characteristics of an ink for use in intaglio printing. That is, the ink of that application gives off a minimum of toxic and flammable fumes while at the same time, it has the consistency necessary to give the desired shade effects in the finished prints. These effects are produced because the ink of said application has the quality that permits the excess ink to be wiped from the plate or roll before the impression is made leaving the desired quantity of ink in the depressions of varying depths in said plate or roll. The ink of that application is readily drawn from the depressions in the plate or roll by the paper, and it has the desired drying qualities needed in an ink for intaglio printing. However, the manufacture of said ink presents difficulties because, as pointed out in said application, it is necessary to subject the constituents of the ink including the glue to a cooking operation in a closed vessel under a pressure of about sixty pounds to the square inch in order to produce the homogeneous mixture desired.

I have found that I can produce an intaglio ink having all of the desirable characteristics of the ink disclosed in that application but of slightly superior quality and at a lower cost, without resorting to cooking under pressure in order to effect the desired homogeneous mixture.

The primary object of this invention accordingly is to produce a semi-oil intaglio ink having the peculiar qualities required of an ink of this character and which ink can be produced by a simple mixing of the constituent parts thereof as by agitation or milling for example, and without the necessity of a pressure cooking operation to bring about the necessary homogeneous combination of the water and the gilsonite solution.

A further object of the invention is to produce an intaglio ink that may be thinned to meet the particular conditions existing in the press room by a hydrocarbon solvent other than gasoline, so that the nauseating and flammable fumes given off by gasoline may be entirely avoided in the press room.

A still further object of the invention is to produce an intaglio ink including a substantial quantity of water to minimize the nauseating effect of the ink that can be manufactured in an extremely simple manner and at a lower cost than was possible heretofore.

Further objects of the invention will appear as a detailed description thereof proceeds.

Essentially the improved intaglio ink of this application comprises a syrup formed by dissolving an asphaltic composition such as gilsonite in a suitable hydrocarbon medium, preferably "solvent naphtha", "M & P thinner" and "10-P thinner" and a syrup consisting of a solution of dextrine in water. The composition just stated constitutes the vehicle of the ink and, as will be understood by a person skilled in the art, suitable pigments are added in order to secure the desired tones and shades.

The term "solvent naphtha" above used, is applied to coal tar distillates coming over between 140° to 170° C. including xylols, xylenes and the like. The product known as "10-P thinner" is a petroleum distillate coming over between 310° to 412° F. while the product known as "M & P thinner" is a petroleum distillate coming over between 251° and 392° F. These distillates are lighter than kerosene but they are heavier and less volatile than gasoline. Their use is to be preferred but it should be understood that mixtures of hydrocarbon solvents having the same or substantially the same properties or characteristics may be used.

As pointed out in my copending application, above referred to, any one of said distillates, combined with an asphaltic composition such as gilsonite in proper proportions produces an intaglio ink having the peculiar characteristics essential to the production of sharply defined prints and readily adapt themselves to the wiping process customarily forming a part of the intaglio printing operation. That is, inks made from gilsonite and the distillates just named in proper proportions have the desired consistency and tackiness so that sufficient ink will adhere to the depressions of varying depth in the printing plate or roll after the operation of the wiper, and at the same time the ink will be readily drawn from said plate or roll by the paper.

In the preferred embodiment of this invention, the syrup of an asphaltic base and a hydrocarbon solvent is formed by using approximately three and one-half pounds of gilsonite to each gallon of hydrocarbon solvent, such as those above specifically pointed out. The syrup thus produced is of relatively low volatility compared to solutions including gasoline but in order to further reduce the volatile nature thereof and to provide a mixture having the desired characteristics, water is combined therewith. Said syrup is prepared by subjecting the gilsonite and solvent to heat in a closed receptacle for a period of approximately ninety minutes under a pressure of about 75 pounds. In order to form a homogeneous mixture of the water and the asphaltic syrup, I form a solution of water and dextrine in the proportions of two pounds of dextrine to every gallon of water and it is this solution that may be combined with the hydrocarbon solution to form a homogeneous mixture by simple agitation or milling and without heating under pressure.

Preferably the intaglio ink vehicle is produced from the solution of dextrine and water and the syrup of gilsonite in one of the above distillates by combining said solution and syrup in the ratio of approximately one to three. The solution and syrup in approximately said proportions are put in a ball or similar mill, the pigments are added at the same time, and the whole mixture is agitated until the desired stable mixture results.

As an example of an improved intaglio ink composition made in accordance with this invention the following formula for the vehicle of said ink is given:

Sixty-three gallons "M & P thinner"
Two hundred twenty-five pounds gilsonite
Fifty-four pounds dextrine
Twenty-seven gallons of water Preferably the intaglio ink vehicle comprises about twenty-two percent of water, about five percent dextrine, about fifty-one percent of the hydrocarbon solvent, and about twenty-two percent of a mineral hydrocarbon such as gilsonite.

The vehicle thus produced is preferably combined with the desired pigments, as above stated, although the composition itself can be used as an intaglio ink without the addition of any pigments since the gilsonite solution is of a brownish tinge. Usually pigments are added in order to secure the desired tone, because generally darker tones are wanted.

The composition above described presents an intaglio ink having all of the characteristics needed in such an ink as above pointed out. It may be made, however, at a low cost and in extremely simple manner, although it presents none of the objectionable features that are inherent in inks involving the use of gasoline. In the ink of my copending application, involving glue, it was sometimes necessary before using said ink, depending upon the conditions in the press room, to vary the consistency of the ink. This could be brought about by the addition of a small quantity of gasoline. The use of gasoline is objectionable because of the toxic and nauseating fumes and danger of fire. I have found that the ink of this application can include a slightly larger percentage of water, thus further reducing its volatility, but it can be brought to the exact consistency desired under existing conditions of use by adding thereto the desired quantity of any one of the hydrocarbon distillates above referred to. Said distillates, have a lower volatility than gasoline. The use of gasoline may thus be entirely avoided.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What I claim as my invention is:

A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting entirely of a syrup of an asphaltic base and a hydrocarbon solvent, a syrup of dextrine and water in the ratio of approximately three parts of said asphaltic syrup to one part of said second named syrup and pigment.

In testimony whereof I affix my signature.

GEORGE D. KNIGHT.